United States Patent [19]

James

[11] Patent Number: 5,220,764
[45] Date of Patent: Jun. 22, 1993

[54] FRONT PANEL ASSEMBLY FOR BARBECUE GRILL CARTS

[75] Inventor: Charles W. James, Columbus, Ga.

[73] Assignee: W. C. Bradley Company, Columbus, Ga.

[21] Appl. No.: 556,180

[22] Filed: Jul. 23, 1990

[51] Int. Cl.⁵ .............................................. E06B 7/08
[52] U.S. Cl. ...................................... 52/473; 52/455; 49/501
[58] Field of Search ................. 52/457, 458, 473, 822, 52/823, 455, 814; 312/297; 49/501 X

[56] References Cited

U.S. PATENT DOCUMENTS

| | | | |
|---|---|---|---|
| 2,235,573 | 3/1941 | Derman | 312/297 X |
| 4,939,880 | 7/1990 | Wang | 52/455 X |

Primary Examiner—Carl D. Friedman
Assistant Examiner—Creighton Smith
Attorney, Agent, or Firm—Hopkins & Thomas

[57] ABSTRACT

A front panel assembly for barbecue grill carts is disclosed, the panel having a pair of mounting brackets pivotally attached to the front legs of the grill cart. Rectangular slats are arranged between the mounting brackets, and are held rigidly in place thereby, to form a substantially solid panel in the front of the barbecue grill cart.

16 Claims, 3 Drawing Sheets

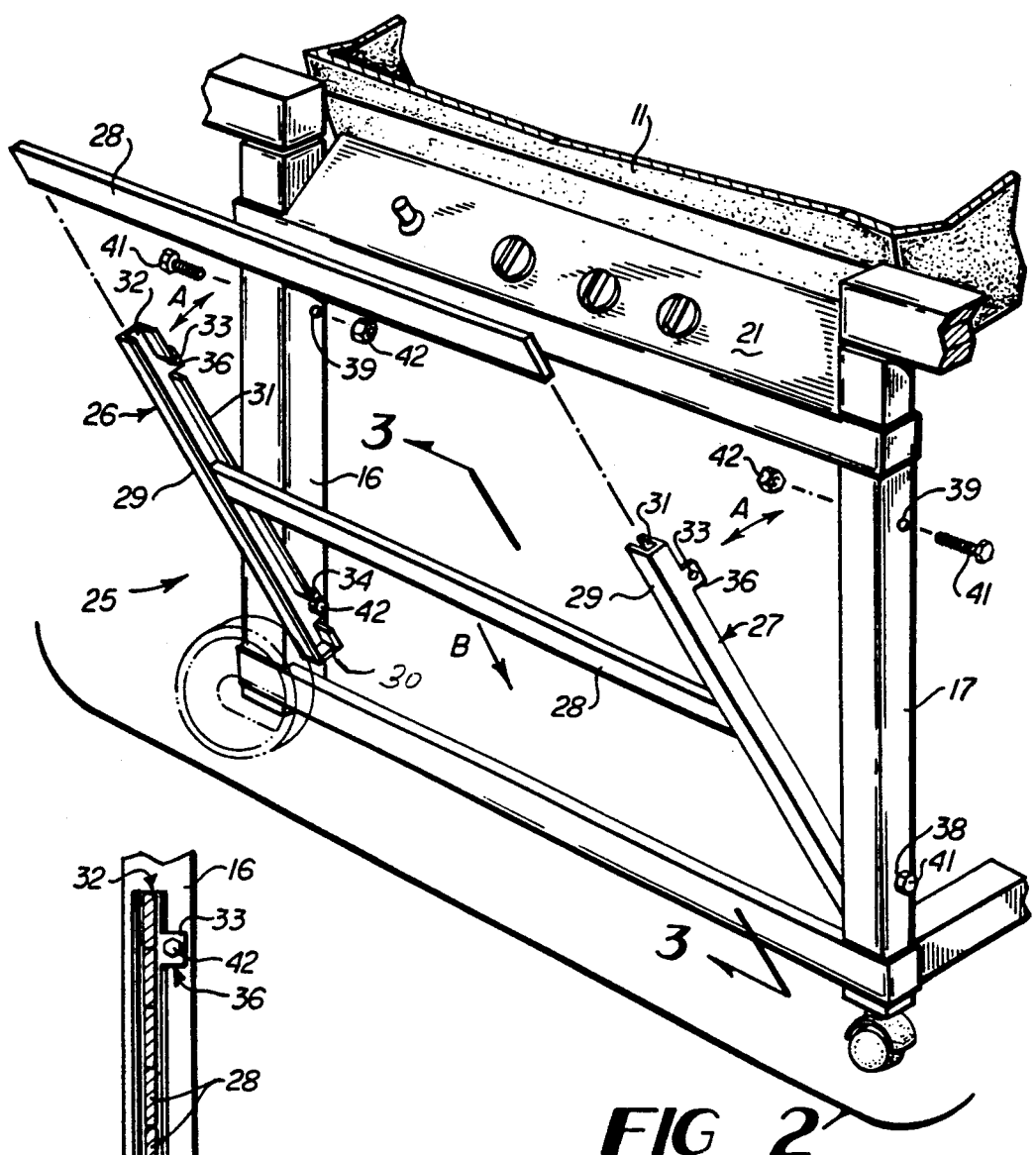
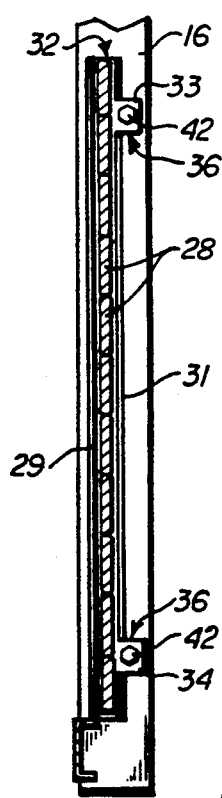
FIG 2
FIG 3

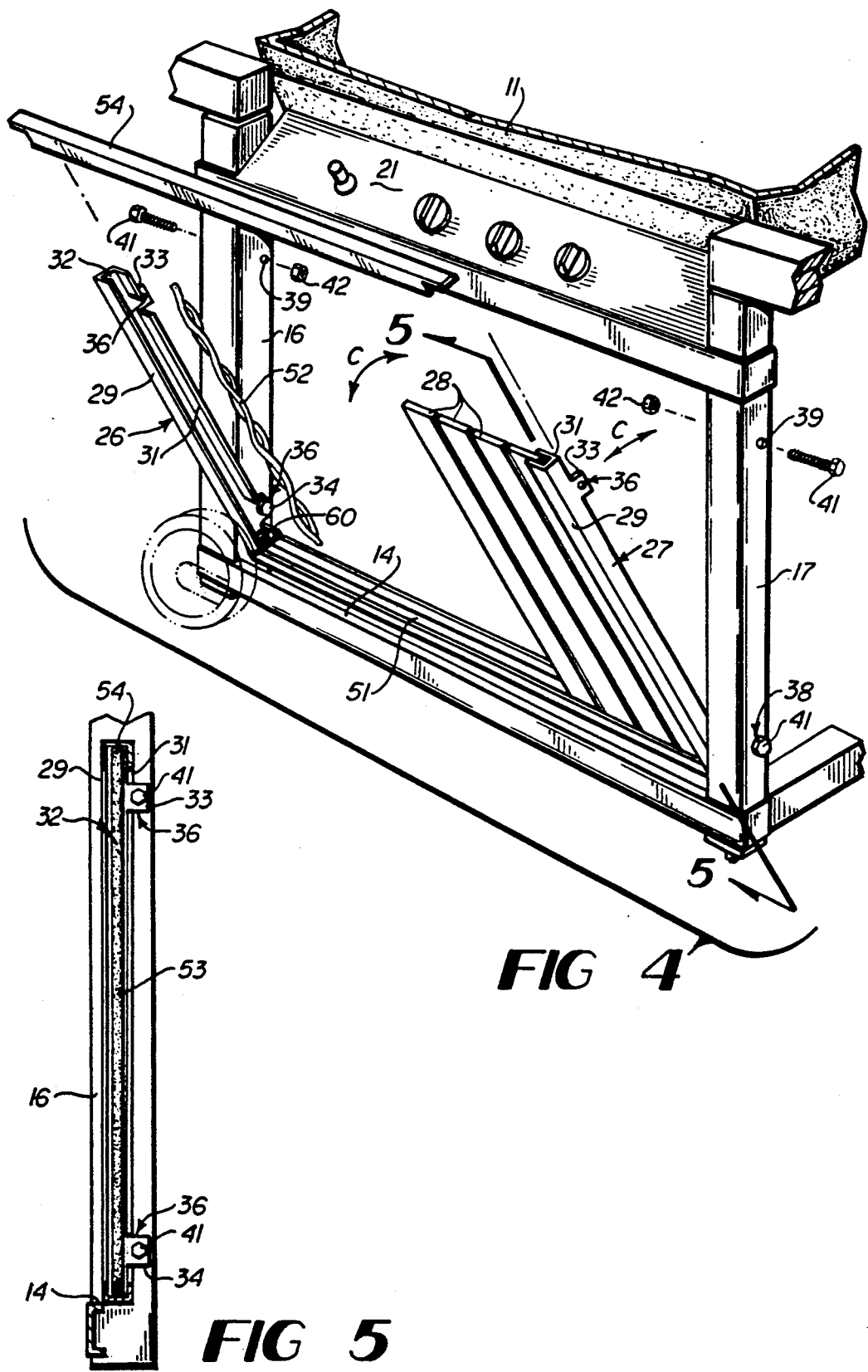

FRONT PANEL ASSEMBLY FOR BARBECUE GRILL CARTS

FIELD OF THE INVENTION

The present invention relates in general to barbecue grill carts and in particular, to a front panel assembly for barbecue grill carts.

BACKGROUND OF THE INVENTION

Portable barbecue grills are often mounted on movable carts for convenience and ease of mobility. Generally, such grill carts have the barbecue grill situated centrally near the top of the cart and have a set of shelves, including side shelves and a lower shelf mounted at the lower portion of the cart. Gas-fueled barbecue grills commonly have an LP gas tank mounted on the lower shelf which provides the fuel for the barbecue grill. With other types of grills, i.e. charcoal grills, the lower shelf may be used to store charcoal. Front panel assemblies are often secured to the front of the cart to hide the LP gas tank or other stored items from view and provide the grill cart with an aesthetically pleasing appearance.

Such front panel assemblies are normally assembled at the factory and shipped with the grill and the cart. These pre-assembled front panels are normally quite large and thus relatively unwieldy, requiring that the carton in which the cart assembly and grill are shipped be quite large as well. As a result, additional packaging, shipping, and handling costs are incurred relative to grills without such a front panel. In addition, the size and shape of the pre-assembled front panels make them difficult to handle and install when the purchaser of the grill assembles the barbecue grill cart at home.

Thus, it is seen that a need exists for a front panel assembly for barbecue grill carts which can be easily manufactured, shipped, and installed on a barbecue grill cart while avoiding the disadvantages of the prior art.

SUMMARY OF THE INVENTION

It is, therefore, one of the principal objects of the present invention to provide a front panel assembly for a barbecue grill cart.

Another object of the present invention is to provide a front panel assembly for a barbecue grill cart which can be shipped in a disassembled state with the barbecue grill and cart without requiring that a larger carton than is used for grills and carts that do not have a front panel.

A further object of the invention is to provide a front panel assembly for a barbecue grill cart which can be quickly and easily assembled by the purchaser of the barbecue grill cart.

These and additional objects are attained by the present invention which relates to a front panel assembly for a barbecue grill cart which is formed by disposing a series of slats adjacent one another. The slats are placed between a pair of vertically extending bracket means which engage the ends of the slats between the extending side walls of the bracket means and rigidly hold the slats in place. The slats are stacked in edge-to-edge abutment with successive slats disposed adjacent the previously stacked slats to thereby form a substantially solid panel. The bracket means are attached to the front legs of the barbecue grill cart, thus securing the front panel formed by the stacked slats to the barbecue grill cart.

Various additional objects and advantages of the present invention will become apparent from the following detailed description, taken in conjunction with the accompanying drawings.

BRIEF DESCRIPTION OF THE DRAWINGS

FIG. 2 is an exploded partial perspective view of the positioning of the slats within the recesses of the brackets so as to form the front panel assembly.

FIG. 3 is a partial cross-sectional view, taken on line 3—3 of FIG. 2, of the front panel assembly in a completely assembled form.

FIG. 4 is an exploded perspective view of an alternate embodiment of the front panel assembly showing the slats arranged vertically between the brackets to form the front panel assembly.

FIG. 5 is a cross-sectional view taken on line 5—5 of FIG. 4, showing a biasing means placed in the recess of one of the brackets when the slats are arranged vertically to compress the slats together.

DETAILED DESCRIPTION OF THE PREFERRED EMBODIMENTS

Figure 1:
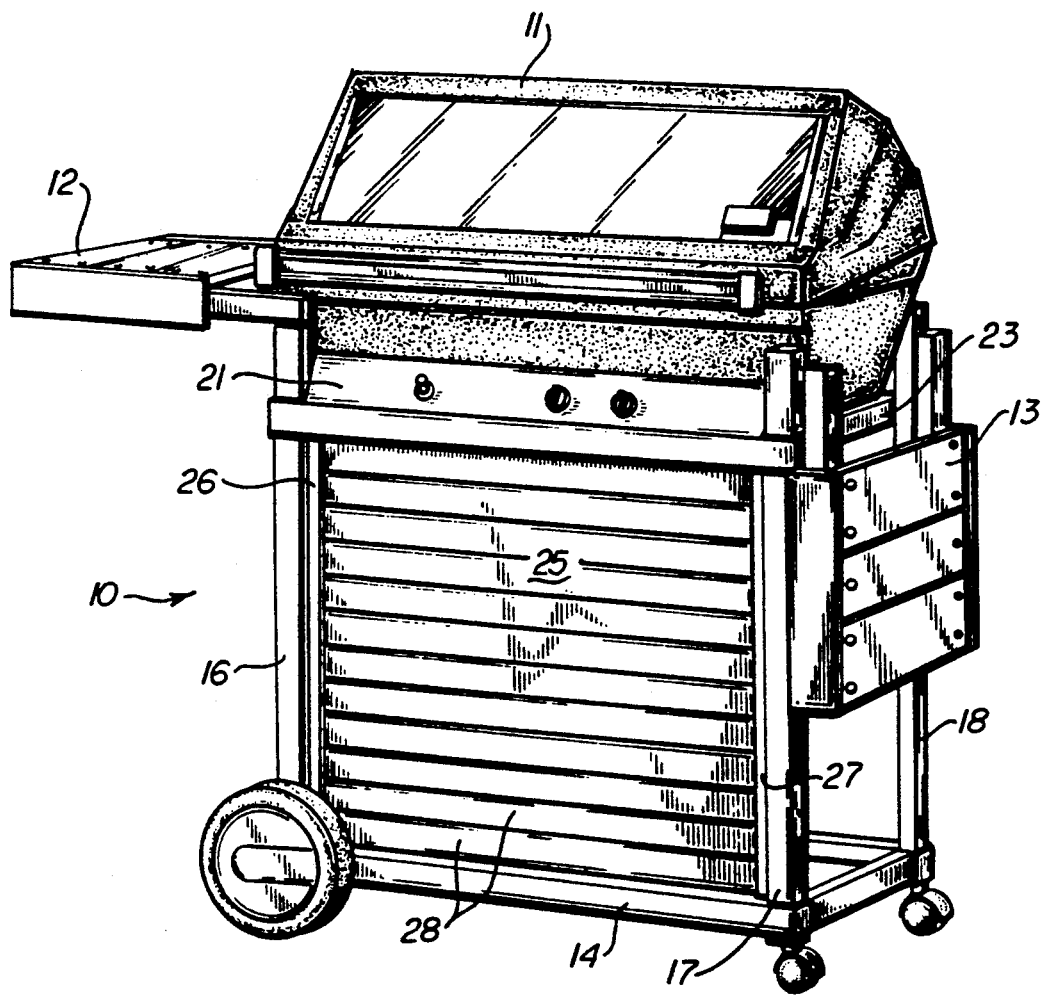
FIG. 1 is a perspective view of a barbecue grill cart utilizing the front panel assembly of the present invention, shown here in a completely assembled form.

Referring now in greater detail to the drawings in which like numerals represent like parts throughout the several views, FIG. 1 shows a barbecue grill cart 10 which supports a barbecue grill 11. The grill cart 10 includes a pair of upper side shelves 12 and 13 which are mounted to the grill cart on opposite sides of the barbecue grill 11 to provide a space for resting dishes, condiments or other items generally used during cooking on a barbecue grill. The cart also includes a lower shelf 14 mounted at the lower portion of the grill cart 10, beneath and parallel to the barbecue grill 11. This lower shelf 14 provides a place for resting the LP gas tank (not shown) for a grill fueled from such a tank or provides a place for additional storage of, for example, charcoal.

A set of four vertically oriented legs 16, 17, 18 and 19, aligned parallel to one another, provide a framework for the generally rectangular cart structure. The legs of the grill cart also normally are provided with wheels 20 or casters 22 and, as noted, the shelves are secured to the legs in a suitable manner.

A control panel 21 is secured to the front legs of the barbecue grill cart, extending between the front legs 16 and 17 of the grill cart 10. The barbecue grill casting is secured to the side struts 23 which each extend between a front and a rear leg on opposite sides of the cart assembly 10. The control panel and the barbecue grill casting serve as structural elements for the upper portion of the cart assembly. As FIG. 1 illustrates, a front panel assembly 25 is mounted to the grill cart 10 directly beneath the front edge of the grill control panel 21 to provide a substantially solid front for the grill cart 10.

As illustrated in FIG. 2, the front panel assembly 25 includes a pair of vertical bracket means or channel members 26 and 27 and a series of slats 28. Each bracket 26 and 27 is a substantially U-shaped track having a pair of side walls 29 and 31 which extend outwardly, parallel to one another, so as to form a recess or channel 32 therebetween. Each bracket also includes a stop member 30 serving as the lower boundary thereof. The brackets 26 and 27 function as mounting means to secure the slats 28 in place.

A pair of tab means or flanges 33 and 34 are formed at the upper and lower end portions, respectively, of each bracket 26 and 27. The tabs are formed from a portion of side wall 31, remaining integral therewith, and are bent so as to extend rearwardly, perpendicular to side wall 31. Each tab 33 and 34 has an aperture 36 formed approximately in the center thereof. Thus, when each bracket 26 and 27 is in its fully upright and vertically oriented position as shown in FIG. 3, the apertures 36 are aligned with corresponding apertures 38 and 39 formed in the front legs 16 and 17 of the grill cart to which the brackets are mounted.

As shown in FIG. 2, bolts 41 are inserted through the apertures 38 and 39 of the front legs 16 and 17 and through the apertures 36 of the upper and lower bracket tabs 33 and 34. These bolts are secured in place by nuts 42 and fasten the brackets 26 and 27 to the front legs 16 and 17 of the grill cart 10.

As FIGS. 2 and 4 illustrate, the slats 28 are rectangularly shaped boards normally formed of wood and are substantially identical in length, width, and thickness. The slats are of a length approximately equal to the distance between the two brackets 26 and 27, and have a thickness of approximately the width of the recess 32 formed between the sidewalls 29 and 31 of the brackets 26 and 27. With these dimensions, the slats 28 can be placed horizontally within the recesses 32 of the brackets 26 and 27, thus spanning the region therebetween and providing a relatively snug fit.

As shown in FIGS. 2 and 3, the front panel assembly 25 is formed by first loosely securing the lower ends of brackets 26 and 27 to the front legs 16 and 17 of the grill cart so that the brackets can be pivoted around the bolts. The apertures 36 in the lower tabs 34 of each bracket 26 and 27 are aligned with apertures 38 at the lower end of the front legs 16 and 17. Bolts 41 are inserted through the apertures 38 of the cart legs and the apertures 36 of the lower tabs 34 and are secured by nuts 42. As FIG. 2 illustrates, the brackets 26 and 27 are tilted forwardly as shown by arrows A. The lower ends of the brackets pivot about the bolt 41 to provide access through the upper ends of the brackets to the recesses 32 of each bracket 26 and 27. The ends of the slats 28 are inserted within the recesses 32 and are slid downwardly in the direction of Arrow B. The slats 28 are stacked horizontally in edge-to-edge relationship with successive slats 28 being stacked on top of previously inserted slats 28.

With all of the slats 28 secured within the brackets 26 and 27, the brackets are tilted rearwardly, as shown by arrows A, toward a substantially vertical position. Bolts 41 are inserted through the apertures 39 at the upper portion of the front legs 16 and 17 and through the apertures 36 of the upper tabs 33 of each bracket and are secured with nuts 42.

The resulting front panel assembly 25, shown in FIG. 1, covers the region bordered on the sides by the front legs 16 and 17 of the grill cart, at the top by the control panel 21, and at the bottom by the lower shelf 14 of the grill cart 10. The completed front panel assembly 25 effectively hides the interior of the cart assembly, thus providing the barbecue grill cart 10 with an aesthetically pleasing appearance.

FIGS. 4 and 5 illustrate an alternate embodiment of a front panel assembly 50 for barbecue grill carts in which the slats 28 are arranged vertically. As shown in FIG. 4, a U-shaped channel 51 forms the bottom of the front panel assembly 50, disposed essentially adjacent to the lower shelf 14 of the grill cart 10. The U-shaped channel 51 is attached to the lower end of both of the brackets 26 and 27 with suitable fasteners, such as screws 60 or other means. The channel 51 functions as a means for holding the lower ends of each of the slats 28 in place, retarding any forward or rearward movement of the lower ends of the slats.

A spring means such as a leaf spring 52 is placed within the recess 32 of bracket 26 at the left side of the grill cart 10. The spring 52 extends along the length of bracket 26, functioning as a biasing means to urge the slats 28 inwardly into tight frictional contact with one another. The spring thus aids in maintaining the rigidity of the panel assembly 50 when fully assembled.

A padding strip 53 is provided within the recess 32 of bracket 27 on the right side of the grill cart 10, positioned parallel to the spring 52. The padding strip 53 provides a cushioned surface for the end slat which is engaged within the recess 32 of the right side bracket 27. A cap 54 fits over the top of the slats 28, engaging the upper ends of the slats to prevent them from tilting forwardly or rearwardly in response to jarring or movement of the grill cart 10.

To assemble this alternate embodiment of the front panel assembly 50, as shown in FIG. 4, the lower ends of the brackets 26 and 28 are secured to the front legs 16 and 17 of the grill cart 10 by bolts 41. The brackets are then tilted forwardly in the direction of arrows C. The vertically oriented slats 28 are placed in horizontal abutment with one another, the lower end resting within U-shaped channel 51. The slats are held against one another to maintain their relative positioning as each successive slat is added. The last slat 28 inserted between the brackets 26 and 27 engages the spring 52. The spring compresses the slats 28 into tight frictional contact with one another to thus form a substantially rigid panel. The cap 54 is then placed over the upper ends of the slats 28, being retained thereon by engagement with the side walls of the brackets, and the brackets 26 and 27 are tilted rearwardly in the direction of arrow C toward a vertically standing upright position. Bolts 41 are inserted through the front legs 16 and 17 of the grill cart 10 and through the apertures 36 in the upper tabs 34 of the brackets 26 and 27 and are secured with nuts 42 to attach the completed front panel assembly 50 to the grill cart.

It will be understood that the foregoing relates only to preferred embodiments of the present invention. It will also be understood by those skilled in the art that numerous changes and modifications may be made to the described embodiments of the invention without departure from the spirit and scope of the invention as set forth in the appended claims.

I claim:

1. A front panel assembly for a barbecue grill cart, comprising:
   a cart framework;
   a pair of vertically oriented channel numbers mounted to said cart framework in a parallel relationship and spaced apart from one another with each of said channel members having an upper end and a lower end;
   said channel numbers each including a substantially U-shaped track having a rear portion with a pair of outwardly extending side walls depending therefrom, and a pair of flanged portions projecting away from said rear portion and perpendicular to said side walls with one of said flanged portions adjacent said upper end of said channel number and said other flanged portion adjacent said lower end of said channel member, each of said flanged portions having an aperture formed therein with fastening means disposed therethrough for securing said channel members to said cart framework; and a plurality of panel slats received between said channel members and rigidly supported by said channel members for forming the front panel of the barbecue cart.

2. The front panel assembly of claim 1 in which said panel slats are elongated, rectangularly shaped boards of a length approximately equal to the spacing between said channel members and wherein said boards are received within said channel members lying in substantially horizontal alignment with successive boards being horizontally stacked on top of previously stacked boards so as to form a substantially solid panel.

3. The front panel assembly of claim 1 in which said panel slats are elongated rectangularly shaped boards of a length approximately equal to said channel members and wherein said boards are placed between said channel members in substantially vertical alignment and arranged parallel to said channel members to form a substantially solid panel.

4. The front panel assembly of claim 3 and further including a spring member mounted within one of said channel members in engagement with one of said vertically aligned slats nearest said channel member to urge said vertically aligned slats into tight contact with one another and said channel member to provide support for said slats.

5. A front panel assembly is defined in claim 1 in which said channel members include a stop member secured to said lower end of each of said channel members for retaining said slats therein.

6. A front panel for a cart assembly, comprising a pair of mounting brackets, a plurality of slats received within said mounting brackets in an aligned relationship and sequentially arranged to form a substantially solid front panel, and a means for mounting said front panel to the cart assembly;

said mounting brackets each including a substantially U shaped track having a rear portion with a pair of outwardly extending side walls depending therefrom, and a pair of flanged portions projecting away from said rear portion and 7. The front panel of claim 6 in which said panel slats are elongated rectangularly shaped boards of a length approximately equal to the spacing between said channel members and wherein said boards are received within said channel members lying in sequential relationship with successive boards being horizontally placed in edge-to-edge relationship on top of previously placed boards to form a substantially solid panel.

8. The front panel of claim 6 in which said means for mounting the front panel to a barbecue grill cart comprises a bolt sized to fit into said apertures formed within each of said flanged portions of said mounting brackets, and a nut affixed to said bolt to secure said bolt and thereby secure the front panel to the barbecue grill cart.

9. A front panel assembly for a barbecue grill cart, comprising a pair of mounting brackets secured to the cart, a plurality of elongated slats which are received in an edge to edge relationship within said mounting brackets to form a substantially solid front panel, and a biasing means positioned within one of said mounting brackets and in contact with one of said slats to urge said slats into contact with one another and hold said slats rigidly together within said brackets.

10. The front panel of claim 9 and further including a cap member disposed over the upper edges of said slats after said slats have been placed together to form the front panel for retaining said slats in an engaged relationship.

11. The front panel assembly of claim 10 in which said mounting brackets include a substantially U-shaped track having a rear portion with a pair of outwardly extending side walls depending therefrom, and a pair of flanged portions projecting away from said rear portion and perpendicular to said side walls with one of said flanged portions adjacent said upper end of said channel member and said other flanged portion adjacent said lower end of said channel member, each of said flanged portions having an aperture formed therein for receiving a fastener to secure said channel members to said cart framework.

12. The front panel assembly of claim 8 in which said panel slats are elongated rectangularly shaped boards of a length approximately equal to the length of said channel members and wherein said boards are placed between said channel members in substantially vertical alignment and arranged parallel to said channel members to form a substantially solid panel.

13. The front panel assembly of claim 9 in which said biasing means comprises a leaf spring.

14. A front panel assembly, comprising
(a) a framework;
(b) a pair of essentially complimentary spaced, opposed, parallel, straight, channel members, each channel member having a central web and a pair of spaced generally parallel flanges protruding from the side edges of said web, the flanges of one channel member extending respectively toward the flanges of the other channel member for defining opposed inwardly opening recesses;
(c) means for securing said channel members within said framework so that the webs of said channel members are a prescribed distance from each other and are parallel to each other;
(d) a plurality of rectangular essentially flat panel slats received by their end portions within said recesses, and within a plane defined by said recesses, each slat being of a length approximately equal to or slightly less than said distance between said webs; each slat being of a length sufficient for said end portions of said slats to be overlapped on both sides by said flanges of said channel members for perpining said slats from appreciable lateral movement from said plane, and slat being arranged in successive side-by-side juxtaposition with each other and with the side edge of one slat being contiguous with the side edge of the next adjacent slat, said slats each being of dimension such that the slats may be slid successively between said channel members and into their respective positions from an end of said opposed channel members inwardly, the thickness of said end portions of said slats being such that said slats all lie generally in a common plane with each other, the width of said slats from one side edge to the other being sufficient that said slats from one side edge to the other being sufficient that said slats will be retained by said channel members from becoming appreciably misaligned from a position essentially perpendicular to said channel members as each slat is slid along said channel members and into its prescribed position, the width of each slat being such that when all of said slats are arranged in juxtaposition with each other, the side edges of the outermost slats are generally aligned with the ends of said channels; and (e) means for confining the outermost slats so that the end positions of said slats remain confined in said recesses.

15. A front panel assembly as claimed in claim 14 wherein said means for receiving said channel members within said framework comprises means for securing said webs to said framework.

16. A front panel assembly as claimed in claim 14 wherein each of at least a plurality of slats supports one of the next adjacent slats.

* * * * *

UNITED STATES PATENT AND TRADEMARK OFFICE
CERTIFICATE OF CORRECTION

PATENT NO. : 5,220,764

DATED : June 22, 1993

INVENTOR(S) : Charles W. James

It is certified that error appears in the above-identified patent and that said Letters Patent is hereby corrected as shown below:

In Column 4, Line 58, after "channel", delete "numbers" and insert therefor -- members --

In Column 4, Line 63, after "channel", delete "numbers" and insert therefor -- members --

In Column 5, Line 1, after "channel", delete "number" and insert therefor -- member --

In Column 5, Line 47, after "and", please add -- perpendicular to said side walls with one of said flanged portions adjacent said upper end of said channel member and said other flanged portion adjacent said lower end of said channel member, each of said flanged portions having an aperture formed therein with a fastening means disposed there through for receiving said channel members to said cart framework.

UNITED STATES PATENT AND TRADEMARK OFFICE
CERTIFICATE OF CORRECTION

PATENT NO. : 5,220,764
DATED : June 22, 1993
INVENTOR(S) : Charles W. James

It is certified that error appears in the above-indentified patent and that said Letters Patent is hereby corrected as shown below:

In column 6, line 52, delete "perpining" and insert therefor --confining --.

Signed and Sealed this

Eighth Day of November, 1994

Attest:

BRUCE LEHMAN

Attesting Officer

Commissioner of Patents and Trademarks